United States Patent
Huber

(10) Patent No.: US 9,638,514 B2
(45) Date of Patent: May 2, 2017

(54) OPTICAL POSITION-MEASURING DEVICE

(71) Applicant: DR. JOHANNES HEIDENHAIN GmbH, Traunreut (DE)

(72) Inventor: Walter Huber, Traunstein (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 0 days.

(21) Appl. No.: 14/975,880

(22) Filed: Dec. 21, 2015

(65) Prior Publication Data
US 2016/0202041 A1 Jul. 14, 2016

(30) Foreign Application Priority Data

Jan. 13, 2015 (DE) ........................ 10 2015 200 293

(51) Int. Cl.
| | | |
|---|---|---|
| *G01D 5/347* | (2006.01) | |
| *G01B 11/14* | (2006.01) | |
| *G01D 5/26* | (2006.01) | |
| *G01B 11/00* | (2006.01) | |

(52) U.S. Cl.
CPC ............ *G01B 11/14* (2013.01); *G01B 11/002* (2013.01); *G01D 5/266* (2013.01)

(58) Field of Classification Search
CPC .. G01D 5/347; G01D 5/3473; G01D 5/34746; G01D 5/266; G01B 11/14
See application file for complete search history.

(56) References Cited

U.S. PATENT DOCUMENTS

| | | | | |
|---|---|---|---|---|
| 5,666,196 A | * | 9/1997 | Ishii | ......................... G01D 5/38 250/237 G |
| 8,472,029 B2 | | 6/2013 | Bridges et al. | |
| 2011/0235051 A1 | * | 9/2011 | Huber | ..................... G01B 11/14 356/499 |
| 2012/0242994 A1 | | 9/2012 | Huber et al. | |
| 2013/0114062 A1 | | 5/2013 | Liesener | |
| 2014/0374579 A1 | | 12/2014 | Goodwin et al. | |
| 2015/0070711 A1 | * | 3/2015 | Holzapfel | ................ G01D 5/38 356/614 |

FOREIGN PATENT DOCUMENTS

| | | |
|---|---|---|
| DE | 102011005937 A1 | 9/2012 |
| JP | 2005326231 A | 11/2005 |

\* cited by examiner

*Primary Examiner* — Jonathan Hansen
(74) *Attorney, Agent, or Firm* — Leydig, Voit & Mayer, Ltd.

(57) ABSTRACT

An optical position-measuring device senses a relative position of two objects. A reflection material measure is connected to one object and a scanning unit is connected to the other object. A beam is split into three sub-beams in a first splitting plane by a first splitting element. The first and third sub-beams are deflected toward the reflection material measure by the deflecting elements, while the second sub-beam is split into fourth and fifth sub-beams by a second splitting element. The first and fourth sub-beams propagate as a first pair of superimposed sub-beams and the third and fifth sub-beams propagate as a second pair of superimposed sub-beams. The first and second pairs of superimposed sub-beams, after being reflected by the reflection material measure, propagate respectively toward detectors, where the sub-beams in each pair are brought into interfering superposition, so that the detectors detect displacement-dependent scanning signals.

16 Claims, 5 Drawing Sheets

OPTICAL POSITION-MEASURING DEVICE

CROSS-REFERENCE TO PRIOR APPLICATION

Priority is claimed to German Patent Application No. DE 10 2015 200 293.4, filed on Jan. 13, 2015, the entire disclosure of which is hereby incorporated by reference herein.

FIELD

The present invention relates to an optical position-measuring device for sensing the relative position of two objects that are movable relative to one another, comprising a scanning unit connected to one of the objects and a reflection material measure connected to the other of the two objects, relative position information being obtained from interfering superposition of at least two pairs of sub-beams. This position measuring device is suitable for simultaneously sensing a vertical and at least one lateral degree of freedom of the two objects that are movable relative to one another.

BACKGROUND

A position-measuring device of this type is known, for example, from FIG. 6 of JP 2005-326231 A. This position-measuring device is used for sensing the relative position of two objects that are movable relative to one another and is composed of a scanning unit connected to one of the objects and a reflection material measure connected to the other of the two objects. Relative position information regarding the two objects results from interfering superposition of at least two pairs of sub-beams. To this end, a beam incident from a light source is split into at least a first, a second, and a third sub-beam in a first splitting plane by a first splitting element in the scanning unit. The first and third sub-beams are subsequently deflected toward the reflection material measure by deflecting elements in the scanning unit. The second sub-beam is split into at least a fourth and a fifth sub-beam by a second splitting element in the scanning unit, the first and fourth sub-beams propagating toward a first point of incidence, and the third and fifth sub-beams propagating toward a second point of incidence on the reflection material measure. After the first and second pairs of superimposed sub-beams are reflected by the reflection material measure, they propagate toward a first and a second detector, where each of the at least two pairs of sub-beams is brought into interfering superposition. The detectors allow detection of displacement-dependent scanning signals from which, in turn, can be derived position information regarding a vertical and a first lateral direction of displacement of the objects.

Thus, using a position-measuring device of this type, it is possible to simultaneously sense a lateral and a vertical degree of freedom of the two objects that are movable relative to one another.

The device known from JP 2005-326231 A is not suitable for measurement tasks where more than these two degrees of freedom must be sensed using metrological techniques.

SUMMARY

In an embodiment, the present invention provides an optical position-measuring device for sensing a relative position of two objects that are movable relative to one another. A reflection material measure is connected to a first one of the two objects and a scanning unit is connected to a second one of the two objects. The scanning unit is configured to provide relative position information using interfering superposition of at least two pairs of sub-beams. The scanning unit comprises a light source, a first and a second splitting element, deflecting elements and a first, a second, a third and a fourth detector, which are disposed in the scanning unit such that: a beam incident from the light source is split into at least a first, a second, and a third sub-beam in a first splitting plane by the first splitting element; the first and third sub-beams are deflected toward the reflection material measure by the deflecting elements, while the second sub-beam is split into at least a fourth and a fifth sub-beam by the second splitting element, the first and fourth sub-beams propagating toward a first point of incidence as a first pair of superimposed sub-beams, and the third and fifth sub-beams propagating toward a second point of incidence on the reflection material measure as a first pair of superimposed sub-beams; and the first and second pairs of superimposed sub-beams, after being reflected by the reflection material measure, propagate respectively toward the first and the second detector, where the sub-beams in each pair are brought into interfering superposition, so that the detectors detect first and second displacement-dependent scanning signals from which, in turn, position information regarding a vertical and a first lateral direction of displacement of the objects is derived, the first lateral direction of displacement extending in the first splitting plane or parallel thereto, wherein the incident beam is additionally split by the first splitting element in the scanning unit into further sub-beams in a second splitting plane which is oriented perpendicular to the first splitting plane, and wherein the sub-beams propagate in the second splitting plane in a manner analogous to the sub-beams in the first splitting plane, so that third and fourth displacement-dependent scanning signals are respectively detected by the third and the fourth detectors, and position information regarding the vertical direction of displacement and a second lateral direction of displacement of the objects is derived from the third and the fourth scanning signals, the second lateral direction of displacement extending in the second splitting plane or parallel thereto.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1A:
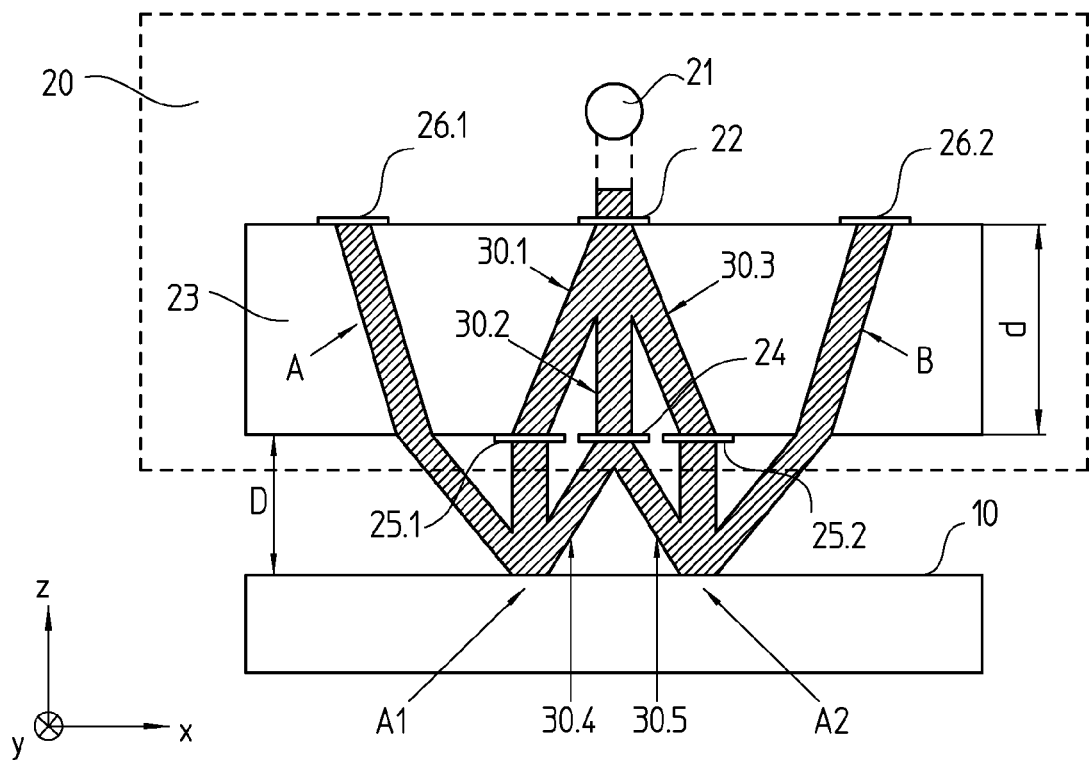
FIG. 1a is a schematic view of the scanning beam path in the xz-plane of an exemplary embodiment of the optical position-measuring device according to the present invention.

In an embodiment, present invention provides an optical position-measuring device of the type mentioned at the outset that enables determination of the spatial position of two relatively movable objects with high accuracy in at least three spatial degrees of freedom.

The inventive optical position-measuring device for sensing the relative position of two objects that are movable relative to one another, in an embodiment, comprises a scanning unit connected to one of the objects and a reflection material measure connected to the other of the two objects. Relative position information is obtained from interfering superposition of at least two pairs of superimposed sub-beams, for which purpose:

a beam incident from a light source is split into at least a first, a second, and a third sub-beam in a first splitting plane by a first splitting element in the scanning unit, and the first and third sub-beams are deflected toward the reflection material measure by deflecting elements in the scanning unit, while the second sub-beam is split into at least a fourth and a fifth sub-beam by a second splitting element, the first and fourth sub-beams propagating toward a first point of incidence, and the third and fifth sub-beams propagating toward a second point of incidence on the reflection material measure, the first and second pairs of superimposed sub-beams, after being reflected by the reflection material measure, propagate toward a first and a second detector, where the sub-beams in each pair are brought into interfering superposition, so that the detectors can detect displacement-dependent scanning signals from which, in turn, can be derived position information regarding a vertical and a first lateral direction of displacement of the objects, the first lateral direction of displacement extending in the first splitting plane or parallel thereto. In the scanning unit, the incident beam is further split by the first splitting element into further sub-beams in a second splitting plane which is oriented perpendicular to the first splitting plane. In the second splitting plane, the sub-beams propagate in a manner analogous to the sub-beams in the first splitting plane, so that third and fourth displacement-dependent scanning signals can be detected by third and fourth detectors. From these scanning signals, position information can be derived regarding the vertical direction of displacement and a second lateral direction of displacement of the objects, the second lateral direction of displacement extending in the second splitting plane or parallel thereto.

Advantageously, in an embodiment, the first splitting element also effects a splitting into at least a sixth, a seventh, and an eighth sub-beam. In this connection, the sixth and eighth sub-beams are deflected toward the reflection material measure by further deflecting elements in the scanning unit, while the seventh sub-beam is split into at least a ninth and a tenth sub-beam by the second splitting element, the sixth and ninth sub-beams propagating toward a third point of incidence, and the eighth and tenth sub-beams propagating toward a fourth point of incidence on the reflection material measure, and the third and fourth pairs of superimposed sub-beams, after being reflected by the reflection material measure, propagate toward the third and fourth detectors, where each of the pairs of sub-beams is brought into interfering superposition, so that the displacement-dependent third and fourth scanning signals can be detected by the third and fourth detectors.

The first splitting element and the second splitting element may each be configured as a two-dimensional diffraction structure arranged in a cross-line or checkerboard pattern.

The two-dimensional diffraction structure may be configured either as an amplitude grating or as a phase grating.

The first splitting element and the second splitting element may each be configured as a two-dimensional transmission-type cross grating.

Preferably, the two splitting planes are oriented perpendicular to one another.

Moreover, the reflection material measure may be configured as a two-dimensional diffraction structure arranged in a cross-line or checkerboard pattern.

The two-dimensional diffraction structure may be configured either as an amplitude grating or as a phase grating.

Advantageously, the reflection material measure may be configured as a two-dimensional reflection-type cross grating.

Furthermore, it may be provided that the scanning unit includes a transparent glass plate which:

has the first splitting element disposed on its side facing the incident light beam, and has the second splitting element and the deflecting elements disposed on its side facing the reflection material measure.

The side of the glass plate that faces the incident light beam may further have disposed thereon the four detectors which are each configured as a structured photodetector and whose light-sensitive surfaces are oriented toward the opposite side of the glass plate.

The structured photodetectors may each have a plurality of periodically arranged detector elements, with in-phase detector elements being electrically interconnected.

Preferably, the structured photodetectors are formed from a-silicon and disposed on the glass plate directly in structured form.

Furthermore, it proves to be advantageous that the detectors be disposed in the same plane as the first splitting element.

It is also advantageous to configure the deflecting elements as transmission-type linear gratings.

Using the optical position-measuring device according to an embodiment of the present invention, it is now possible to sense at least three spatial degrees of freedom with high accuracy using metrological techniques, namely a vertical relative displacement of two objects that are movable relative to one another, as well as relative displacements of these objects along two lateral directions of displacement.

It is also advantageous that, unlike the prior art discussed at the outset, the optical position-measuring device according to the present invention allows the use of gratings having small grating periods, which, in turn, allows generation of scanning signals of particularly high resolution that enable very accurate position determination.

Moreover, unwanted radiated noise, which negatively affects the generation of the scanning signals, can be particularly effectively reduced in the position-measuring device of an embodiment of the present invention.

An exemplary embodiment of the optical position-measuring device according to the present invention will now be described with reference to FIGS. 1a, 1b, 2, 3a, 3b, 4 and 5.

Figure 1B:
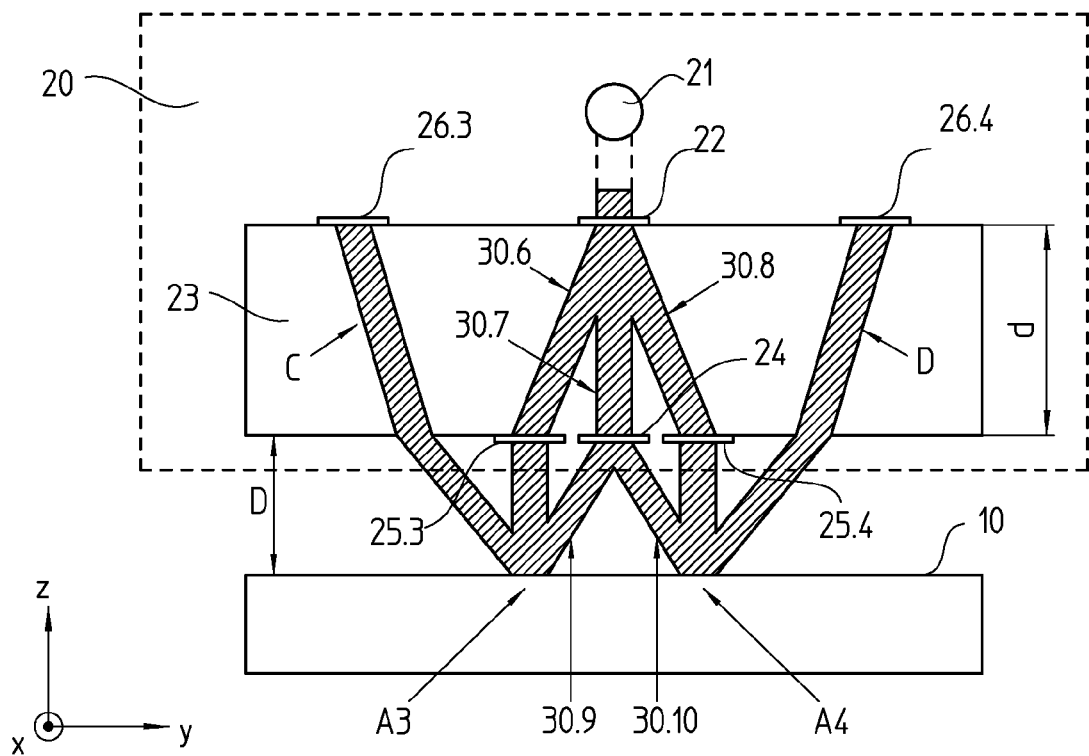
FIG. 1b is a schematic view of the scanning beam path in the yz-plane of an exemplary embodiment of the optical position-measuring device according to the present invention.
Figure 2:
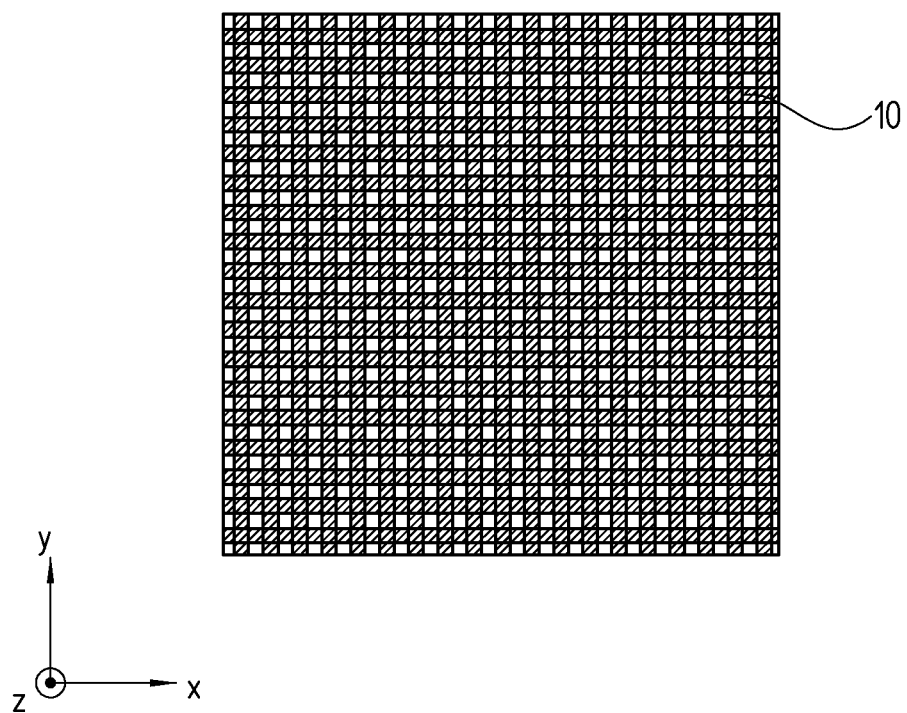
FIG. 2 is a plan view of the reflection material measure of the optical position-measuring device of FIG. 1.
Figure 3A:
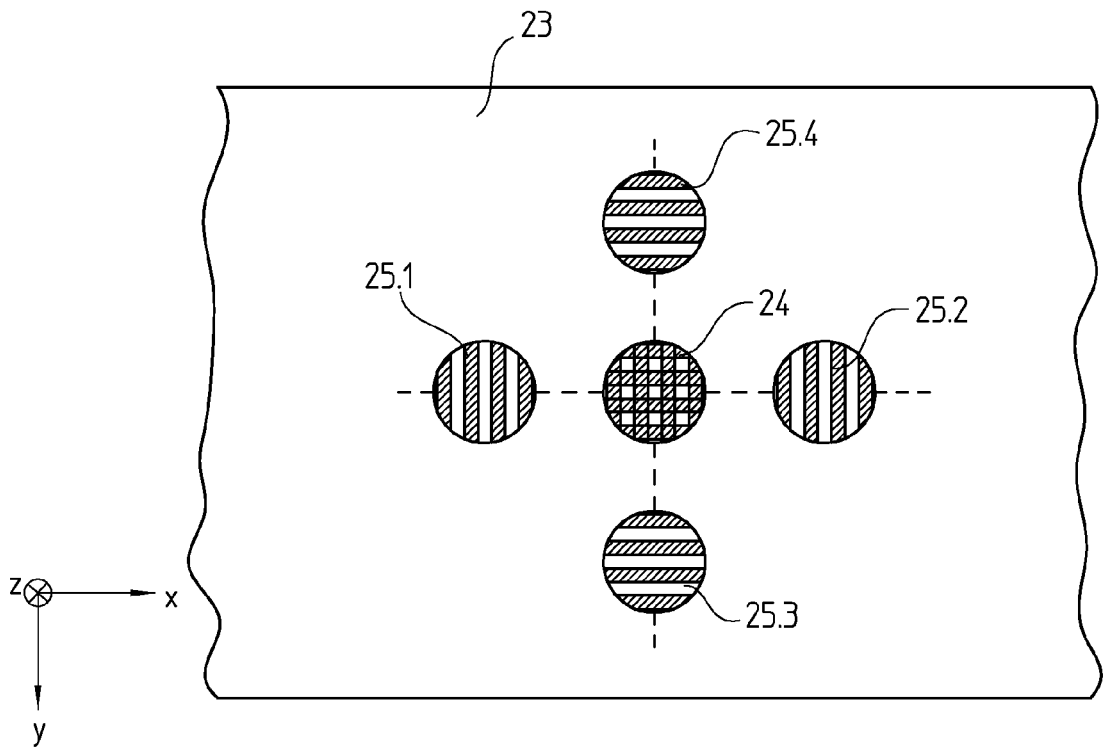
FIG. 3a is a plan view of that side of the glass plate in the scanning unit of the optical position-measuring device of FIG. 1 which faces the reflection material measure.
Figure 3B:
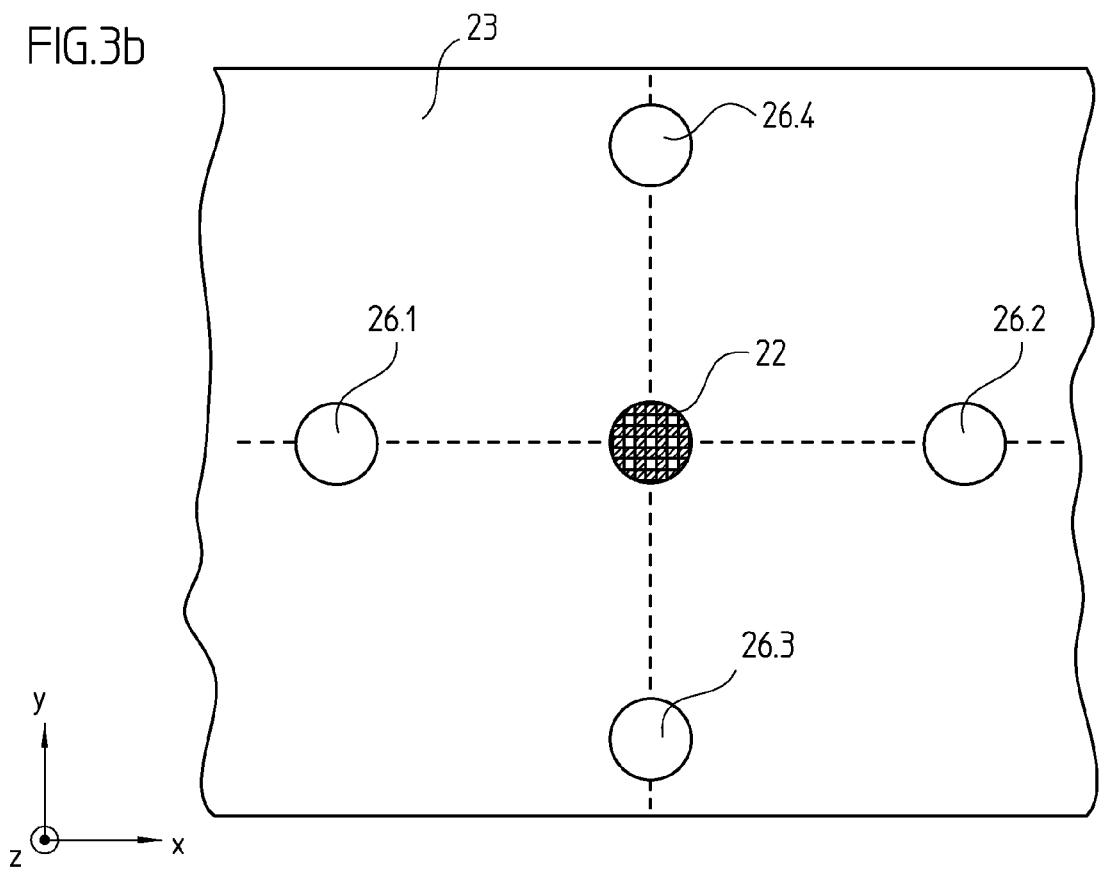
FIG. 3b is a plan view of that side of the glass plate in the scanning unit of the optical position-measuring device of FIG. 1 which faces the incident beam.
Figure 4:
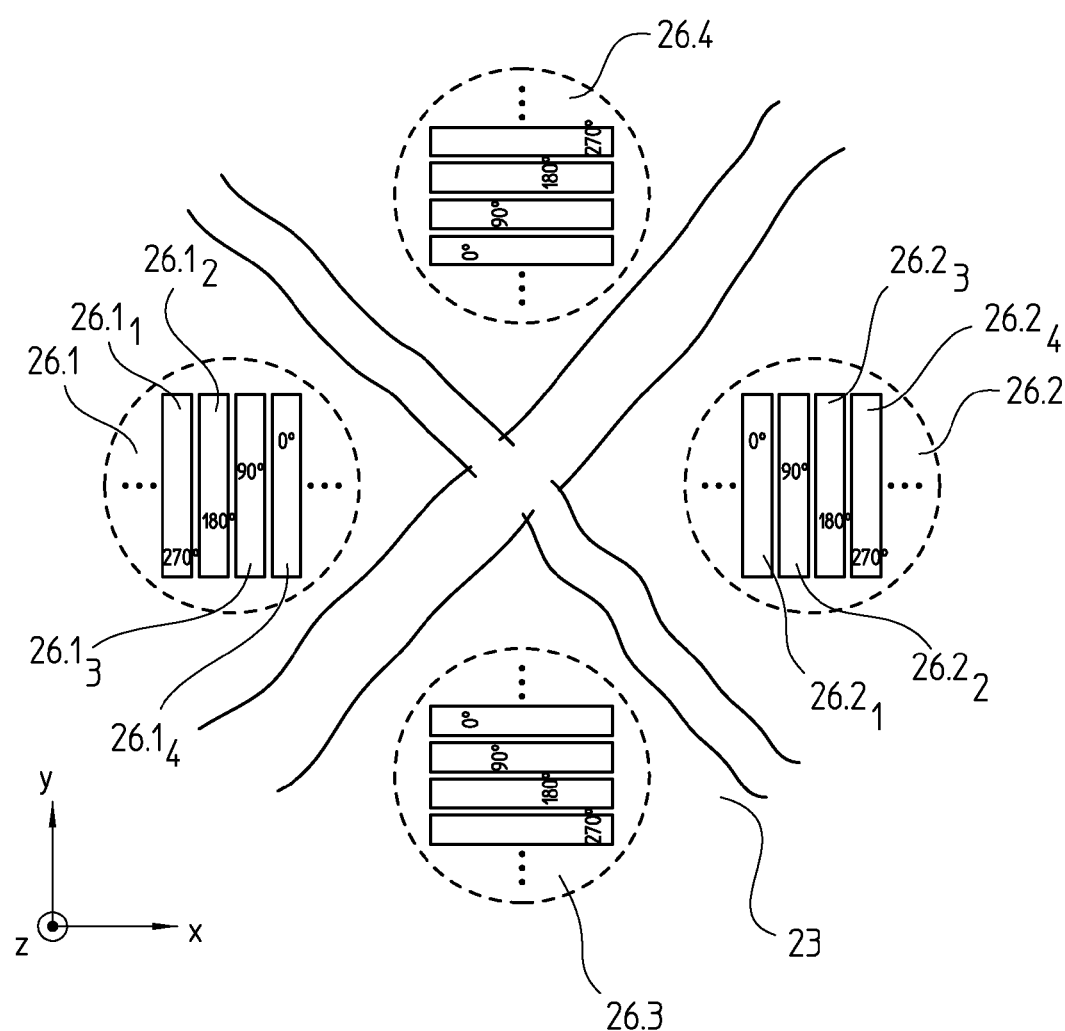
FIG. 4 shows partial plan views of the four detectors of the optical position-measuring device of FIG. 1.

FIGS. 1a, 1b show, in highly schematic form, the scanning beam paths in different planes; FIG. 2 shows a plan view of the reflection material measure used; FIG. 3a and FIG. 3b show partial views of the upper and lower sides of the glass plate used in the scanning unit; and FIG. 4 shows partial plan views of the four detectors in the scanning unit. The signal processing in the described position-measuring device will be explained with reference to FIG. 5.

The optical position-measuring device according to the present invention is composed of a scanning unit 20 as well as a reflection material measure 10 that is movable relative thereto. Scanning unit 20 and reflection material measure 10 are connected to two objects that are movable relative to one another and whose relative position is to be sensed. Relative movement is provided between the objects at least along a vertical direction of displacement z and along two lateral directions of displacement x, y. The two lateral directions of displacement x, y are oriented perpendicular to one another; the vertical direction of displacement z is oriented perpendicular to the two lateral directions of displacement x, y. The objects connected to scanning unit 20 and reflection material measure 10 may, for example, be machine parts which are movable relative to one another. Relative positioning of these objects is performed by subsequent electronics based on the generated scanning signals of the optical position-measuring device according to the present invention.

In the exemplary embodiment shown, scanning unit 20 includes a light source 21 as well as a glass plate 23 having different optically active elements and detectors 26.1-26.4, which are disposed on the upper and lower sides of glass plate 23. The side that will hereinafter be referred to as the upper side of glass plate 23 faces the beam incident from light source 21; the lower side of glass plate 23 faces reflection material measure 10. The functions of the individual components in scanning unit 20 will be described in more detail in the following description of the scanning beam path.

In the present example, reflection material measure 10 is configured as a two-dimensional reflection-type cross grating, which is shown in plan view in FIG. 2. Generally, a two-dimensional diffraction structure which is in the form of an amplitude grating or a phase grating and is arranged in a cross-line or checkerboard pattern is provided as a reflection material measure 10 in the optical position-measuring device according to the present invention. The two-dimensional diffraction structure is composed of a one-dimensional material measure in the first lateral direction of displacement x and, superimposed thereon, a one-dimensional material measure in the second lateral direction of displacement y, which is perpendicular to the first lateral direction of displacement x. In a possible embodiment, the reflection-type cross grating has the same grating period $TP_M$ in both directions x, y. In a specific exemplary embodiment, the grating period is selected to be $TP_M$=1.45 µm.

Using the optical position-measuring device of the present invention, relative position information regarding the relative position of reflection material measure 10 and scanning unit 20 along the two lateral direction of displacement x, y and the vertical direction of displacement z can be generated from the interfering superposition of at least two pairs of sub-beams. Any change in the relative position of reflection material measure 10 and scanning unit 20 cause phase differences in the interfering sub-beams. These phase differences then produce phase-shifted, periodically modulated scanning signals, which are detected by a plurality of detectors 26.1-26.4.

The specific scanning beam path of the illustrated exemplary embodiment of the inventive optical position-measuring device, as well as further details thereof, will now be described.

A beam emitted by a light source 21, for example, a laser diode having a wavelength of 780 nm, impinges, in scanning unit 20, perpendicularly and in collimated form on a first splitting element 22 disposed on the upper side of transparent glass plate 23. Collimation can be achieved, for example, by providing a suitable collimator lens between light source 21 and first splitting element 22. As shown in FIG. 1a, the beam incident from light source 21 is split by first splitting element 22 into a first sub-beam 30.1, a second sub-beam 30.2, and a third sub-beam 30.3 in a first splitting plane xz. First splitting plane xz is coincident with the plane of the paper in FIG. 1a and is defined by the first lateral direction of displacement x and the vertical direction of displacement z.

In the present case, first splitting element 22 is configured as a transmission-type cross grating, as is apparent from FIG. 3b. In a possible embodiment, the transmission-type cross grating has the same grating period $TP_{A1}$ in both directions of extension x, y and is selected to be, for example, $TP_{A1}$=1.38 µm.

Generally, in the optical position-measuring device according to the present invention, provision is made for first splitting element 22 to be configured as a two-dimensional diffraction structure arranged in a cross-line or checkerboard pattern. The respective diffraction structure may be provided in the form of either an amplitude grating or a phase grating.

In the present exemplary embodiment, first sub-beam 30.1 represents the $-1^{st}$ diffraction order resulting at the transmission-type cross grating in first splitting plane xz, second sub-beam 30.2 represents the $0^{th}$ diffraction order, and third sub-beam 30.3 represents the $+1^{st}$ diffraction order.

After passing through glass plate 23, first and third sub-beams 30.1, 30.3 reach deflecting elements 25.1, 25.2, which are disposed on the lower side of glass plate 23. First and third sub-beams 30.1, 30.3 are deflected by deflecting elements 25.1, 25.2 in first splitting plane xz toward reflection material measure 10. The deflection is performed such that the two sub-beams 30.1, 30.3 subsequently impinge perpendicularly and in collimated form on reflection material measure 10.

As can be seen from FIG. 3a, deflecting elements 25.1, 25.2 are made up of transmission-type linear gratings having grating elements periodically arranged along the first lateral direction of displacement x. The grating elements represent the phase bars of a phase grating in which the $0^{th}$ diffraction order is suppressed. The longitudinal direction of the phase bars extends along the second lateral direction of displacement y. In a possible embodiment, grating periods $TP_{U1}$, $TP_{U2}$ of the two deflecting elements 25.1, 25.2 are selected to be identical according to $TP_{U1}$=$TP_{U2}$=1.38 µm.

The second sub-beam 30.2 resulting at first splitting element 22 also passes through glass plate 23 and impinges on a second splitting element 24 disposed on the lower side of glass plate 23. Second sub-beam 30.2 is split by second splitting element 24 into a fourth sub-beam 30.4 and a fifth sub-beam 30.5 in first splitting plane xz. These sub-beams 30.4, 30.5 then each propagate in collimated form toward reflection material measure 10.

The illumination of reflection material measure 10 by collimated sub-beams 30.1, 30.3, 30.4, 30.5 ensures that a relatively large scanning field is scanned on reflection material measure 10. This significantly reduces signal interference caused by possible defects in the grating structure of reflection material measure 10 or by possible dirt accumulated on reflection material measure 10. Given the indicated system parameters of an exemplary embodiment of the optical position-measuring device according to the present invention, typical cross sections of the sub-beams that impinge in collimated form on reflection material measure 10 are on the order of 0.5 mm.

The second splitting element 24 on the lower side of glass plate 23 is also configured as a transmission-type cross grating, as is apparent from FIG. 3a. Generally, in the optical position-measuring device according to the present invention, provision is also made for second splitting element 24 to be configured as a two-dimensional diffraction structure arranged in a cross-line or checkerboard pattern. In this case, too, the respective diffraction structure may be provided in the form of either an amplitude grating or a phase grating. In a possible embodiment, the transmission-type cross grating of second splitting element 24 has the same grating period $TP_{A2}$ in both directions of extension x, y and is selected to be $TP_{A2}=1.45$ μm.

In the present case, fourth sub-beam 30.4 represents the $-1^{st}$ diffraction order resulting at the transmission-type cross grating of second splitting element 24 in first splitting plane xz; fifth sub-beam 30.5 represents the $+1^{st}$ diffraction order.

Thus, after passing through glass plate 23, first and fourth sub-beams 30.1, 30.4 propagate toward a first point of incidence A1 on reflection material measure 10, and third and fifth sub-beams 30.3, 30.5 propagate toward a second point of incidence A2 on reflection material measure 10. As can be seen from FIG. 1a, the two points of incidence A1, A2 are spaced apart from each other along the first direction of displacement x. The two pairs of incident sub-beams 30.1, 30.4 and 30.3, 30.5 are diffracted at the two points of incidence A1, A2 and reflected back therefrom toward scanning unit 20; i.e., toward glass plate 23. In this connection, in the first pair of interfering sub-beams (on the left in FIG. 1a), the $0^{th}$ reflected diffraction order of fourth sub-beam 30.4 resulting at reflection material measure 10 and the $-1$st reflected diffraction order of first sub-beam 30.1 resulting at reflection material measure 10 are used for signal generation. Likewise, in the second pair of interfering sub-beams (on the right in FIG. 1a), the $0^{th}$ reflected diffraction order of fifth sub-beam 30.5 resulting at reflection material measure 10 and the $+1^{st}$ reflected diffraction order of third sub-beam 30.3 resulting at reflection material measure 10 are used for signal generation. Sub-beam pairs 30.1/30.4 and 30.3/30.5 then pass again through glass plate 23 and are brought into interfering superposition on the two detectors 26.1, 26.2. The two detectors 26.1, 26.2 are disposed on the upper side of glass plate 23, as is first splitting element 22. The sub-beams 30.1, 30.4 from the first pair of interfering sub-beams that result from a $0^{th}$ diffraction order and a $-1^{st}$ diffraction order at reflection material measure 10 are brought into superposition on first detector 26.1. The sub-beams 30.3, 30.5 from the second pair of interfering sub-beams that result from a $0^{th}$ diffraction order and a $+1^{st}$ diffraction order at reflection material measure 10 are brought into superposition on second detector 26.2. The first pair of superimposed sub-beams 30.1, 30.4 will hereinafter also be referred to as first signal beam A, and the second pair of superimposed sub-beams 30.3, 30.5 as second signal beam B.

Detectors 26.1, 26.2 allow detection of first and second displacement-dependent scanning signals from which can be derived position information regarding a vertical direction of displacement z and the first lateral direction of displacement x of the objects, the first lateral direction of displacement x extending in first splitting plane xz or parallel thereto.

In the exemplary embodiment shown, provision is made for a so-called "Vernier analysis" to generate a plurality of phase-shifted fractional scanning signals within the first and second scanning signals, which will be explained hereinafter. However, this is not essential to the present invention. It is in principle also possible to use alternative methods for generating phase-shifted fractional scanning signals, as will be discussed in the description below.

In the case of the Vernier analysis used here, the slight difference of about 0.35% between grating period $TP_{A2}=1.45$ μm of second splitting element 24 and grating period $TP_M=1.455$ μm of reflection material measure 10 ensures that the sub-beams 30.1, 30.4 and 30.3, 30.5 contained in the respective signal beams A, B in each case propagate at slightly different angles from points of incidence A1, A2 on reflection material measure 10 toward detectors 26.1, 26.2. In the case of the parameters mentioned above for second splitting element 24 and reflection material measure 10, an angle of about 2 mrad is obtained between the sub-beams 30.1, 30.4 and 30.3, 30.5 within a respective signal beam A, B. As a result, a periodic (Vernier) fringe pattern having a periodicity $TP_{SM}=400$ μm is then produced in the detection plane of detectors 26.1, 26.2.

Figure 5:
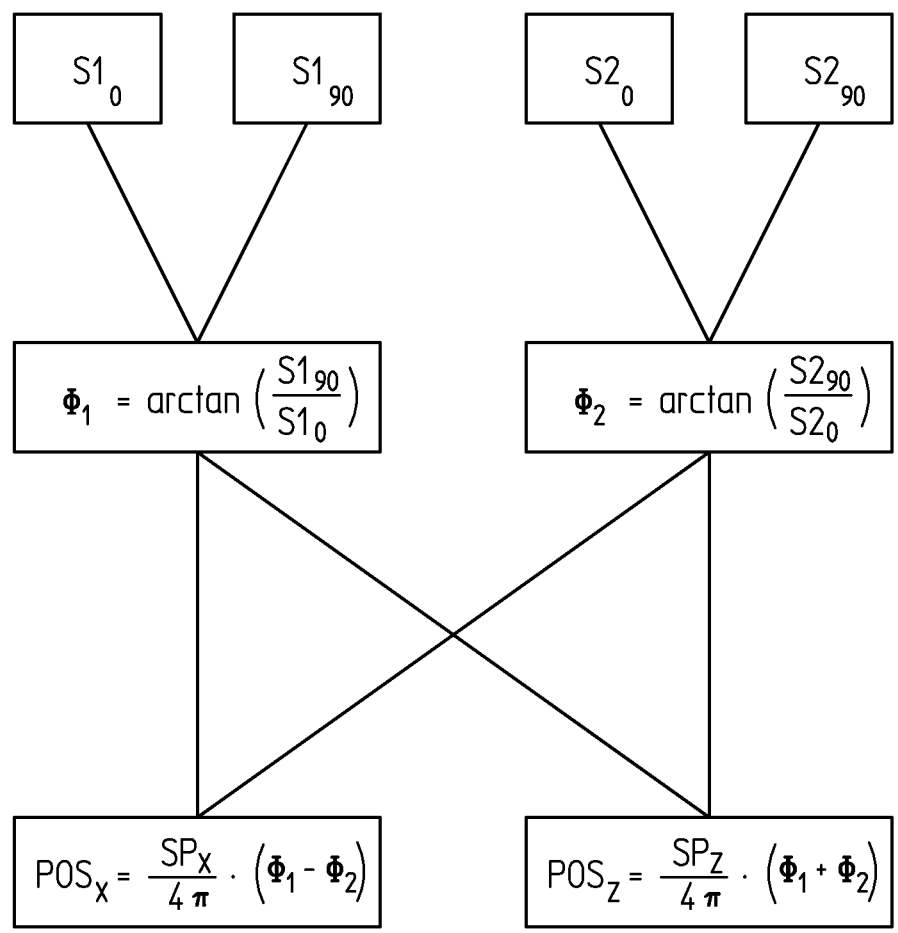
FIG. 5 is a highly schematic view illustrating the signal processing in the optical position-measuring device of FIG. 1.

In the present exemplary embodiment, to detect the periodic fringe pattern, detectors 26.1, 26.2 are configured as structured photodetectors on the upper side of glass plate 23. As shown in FIG. 4, these detectors are composed of a plurality of detector elements $26.1_1, 26.1_2 \ldots 26.1_n$, respectively $26.2_1, 26.2_2 \ldots 26.2_n$, and are arranged periodically along the first direction of displacement x, with in-phase detector elements $26.1_1, 26.1_2 \ldots 26.1_n$, respectively $26.2_1, 26.2_2 \ldots 26.2_n$, being electrically interconnected. The light-sensitive surfaces of detector elements $26.1_1, 26.1_2 \ldots 26.1_n$, respectively $26.2_1, 26.2_2 \ldots 26.2_n$, are oriented toward reflection material measure 10. In the present exemplary embodiment, the structured photodetectors are formed from a-silicon and disposed on glass plate 23 directly in structured form. In the present case, four detector elements $26.1_1$-$26.1_4$, respectively $26.2_1$-$26.2_4$, are provided per fringe pattern period. This is schematically illustrated in FIG. 4. Four fractional scanning signals having the phase relationships indicated in FIG. 4; i.e., four 90°-phase-shifted fractional scanning signals, are then generated per fringe pattern period by means of detector elements $26.1_1$-$26.1_4$ and $26.2_1$-$26.2_4$, respectively. By connecting two respective opposite-phase fractional scanning signals in anti-parallel, two offset-free, 90°-phase-shifted scanning signals $S1_0$, $S1_{90}$, respectively, $S2_0$, $S2_{90}$, are generated per detector 26.1, 26.2, which are then further processed as illustrated in FIG. 5. This figure symbolically illustrates the generation of the position values from scanning signals $S1_0$, $S1_{90}$ and $S2_0$, $S2_{90}$, respectively. These position values are dependent on both a lateral displacement and a vertical displacement of the objects relative to one another. The electronic processing into position values $POS_x$, $POS_z$ that can be uniquely and exclusively associated with one of the two displacement movements (lateral, vertical) is based on subtraction and summation of the phase values $\Phi_1$ and $\Phi_2$ obtained from scanning signals $S1_0$, $S1_{90}$ and $S2_0$, $S2_{90}$, respectively, as illustrated in FIG. 5.

In the optical position-measuring device according to the present invention, it can be ensured, by selecting suitable dimensioning parameters, that the optical paths of all sub-beams which are brought into interfering superposition in the detection planes of detectors 26.1, 26.2 have the same length between first splitting element 22 and the respective first or second point of incidence A1, A2 on reflection material measure 10 at the nominal scanning distance D. The nominal scanning distance D between reflection material measure 10 and glass plate 23 is understood here to be the distance at which first and fourth sub-beams 30.1, 30.4 are superimposed on each other without lateral offset at first point of incidence A1 and third and fifth sub-beams 30.3, 30.5 are superimposed on each other without lateral offset at second point of incidence A2 on reflection material measure 10. To this end, the grating periods $TP_{A1}$, $TP_{A2}$, $TP_{U1}$, $TP_{U2}$ of splitting elements 22, 24 and deflecting elements 25.1, 25.2, as well as the thickness d of glass plate 23 and the nominal scanning distance D are suitably matched. In this way, it can be ensured that at the nominal scanning distance D, position determination is performed in a wavelength-independent manner. The position determination is not affected by potential variations in environmental conditions, and thus in wavelength.

In an exemplary embodiment, given the above-mentioned grating periods of the different gratings, as well as a thickness d of glass plate 23 of d=2.5 mm and a nominal scanning distance D=1.56 mm, a position-measuring device is obtained which is wavelength-compensated at the nominal scanning distance D and in which the signal period $SP_x$ of the scanning signals for movement along the first lateral direction of displacement x is $SP_x$=1.455 μm and the signal period $SP_z$ of the scanning signals for movement along the vertical direction of displacement z is $SP_z$=5 μm.

Using the position-measuring device according to the present invention, it is now possible not only to measure relative movement between scanning unit 20 and reflection material measure 10 along the first lateral direction of displacement x and along the vertical direction of displacement z, but also to sense displacement movements along the second lateral direction of displacement y.

To this end, provision is made for the beam incident from light source 21 to be additionally split by first splitting element 22 in scanning unit 20 into further sub-beams 30.6, 30.7, 30.8, 30.9, 30.10 in a second splitting plane yz which is oriented perpendicular to first splitting plane xz. The scanning beam path resulting in second splitting plane yz downstream of first splitting element 22 basically corresponds to the scanning beam path in first splitting plane xz, but is rotated 90° with respect thereto in the direction of displacement z. The respective scanning beam path in the second splitting plane is shown in detail in FIG. 1b. Accordingly, the different sub-beams 30.6, 30.7, 30.8, 30.9, 30.10 propagate in second splitting plane yz in a manner analogous to the different sub-beams 30.1, 30.2, 30.3, 30.4, 30.5 in first splitting plane xz. In this scanning beam path, third and fourth detectors 26.3, 26.4 allow detection of third and fourth displacement-dependent scanning signals from which can be derived position information regarding the vertical direction of displacement z and the second lateral direction of displacement y of the objects, the second lateral direction of displacement y extending in second splitting plane yz or parallel thereto.

As shown in FIG. 1b, first splitting element 22, in addition to effecting splitting in first splitting plane xz (FIG. 1a), also splits the incident beam into a sixth sub-beam 30.6, a seventh sub-beam 30.7, and an eighth sub-beam 30.8. Sixth sub-beam 30.6 and eighth sub-beam 30.8 are deflected toward reflection material measure 10 by further deflecting elements 25.3, 25.4. Seventh sub-beam 30.7 is split by second splitting element 24 into a ninth sub-beam 30.9 and a tenth sub-beam 30.10. After passing through glass plate 23, sixth and ninth sub-beams 30.6, 30.9 finally propagate toward a third point of incidence A3 on reflection material measure 10; eighth and tenth sub-beams 30.8, 30.10 propagate toward a fourth point of incidence A4. Third and fourth points of incidence A3, A4 are spaced apart from each other along the second direction of displacement y. The pairs of superimposed sub-beams 30.6/30.9 and 30.8/30.10, after being reflected by the reflection material measure, propagate as signals beams C, D toward third and fourth detectors 26.3, 26.4. There, the sub-beams 30.6, 30.9; 30.8, 30.10 in the two pairs are brought into interfering superposition respectively, so that the displacement-dependent third and fourth scanning signals can be detected by third and fourth detectors 26.3, 26.4.

With regard to the design of the different components in the scanning beam path of second splitting plane yz, and with regard to suitable signal analysis, reference is made to the explanations given above with respect to the scanning beam path in first splitting plane xz. Deflecting elements 25.3, 25.4 of the last-described scanning beam path, and also detectors 26.3, 26.4, are, of course, configured or oriented such that they are rotated 90° relative to the corresponding elements of the scanning beam path described at the outset.

In an exemplary embodiment, given the aforementioned parameters, the resulting scanning signals indicative of movement along the second lateral direction of displacement y have the same signal period $SP_y$ as the scanning signals regarding the first lateral direction of displacement x; i.e., $SP_y$=$SP_x$=1.455 μm.

In addition to the exemplary embodiment specifically described herein, other embodiments of the inventive position-measuring device are, of course, possible within the scope of the present invention.

As mentioned earlier herein, it is not absolutely necessary to use the above-described Vernier analysis in order to generate a plurality of phase-shifted fractional scanning signals. In the position-measuring device according to the present invention, it would also be possible to generate such signals using, for example, what is known as polarization encoding. In this case, for example, the second splitting element and the deflecting elements have to be configured as circular polarizers in the $1^{st}$ diffraction order. As a result, left-handed and right-handed circularly polarized sub-beams are brought to interference. In contrast to the above-described Vernier analysis, the sub-beams which are reflected back from the points of incidence on the reflection material measure and which constitute the signal beams that propagate toward the scanning unit have the same directions of propagation. Here, instead of the detectors, respective further splitting elements in the form of linear transmission-type phase gratings are disposed on the upper side of the glass plate. These further splitting elements split the incident signal beams into three sub-signal beams, respectively. These sub-signal beams are subsequently delivered to an optical polarization detection unit which, inter alia, also includes the detectors and which is known in a slightly modified form, for example, from the Applicant's German Patent Application DE 10 2011 005 937 A1, to which reference is expressly made here. The lambda/4 plate and the splitter grating of the detection unit of DE 10 2011 005 937 A1 can be omitted in the detection units of the present application because the left-handed and right-handed circularly polarized sub-beams needed for the analysis are already present in the signal beams.

There are, of course, other alternative ways of suitably placing optical polarization components in the beam paths.

Furthermore, unlike the illustrated exemplary embodiment, the required light source may be disposed elsewhere than in the scanning unit. In principle, it is also possible to dispose the light source remote from the scanning unit, and to deliver the emitted light beam to the scanning unit; i.e., to the first splitting element, via an optical waveguide.

Finally, the illustrated exemplary embodiment could be supplemented by additional focusing elements disposed between the light source and the reflection material measure and used for focusing the sub-beams onto the reflection material measure, etc.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An optical position-measuring device for sensing a relative position of two objects that are movable relative to one another, the optical position-measuring device comprising:
   a reflection material measure connected to a first one of the two objects; and
   a scanning unit connected to a second one of the two objects, the scanning unit being configured to provide relative position information using interfering superposition of at least two pairs of sub-beams, the scanning unit comprising a light source, a first and a second splitting element, deflecting elements and a first, a second, a third and a fourth detector, which are disposed in the scanning unit such that:
      a beam incident from the light source is split into at least a first, a second, and a third sub-beam in a first splitting plane by the first splitting element,
      the first and third sub-beams are deflected toward the reflection material measure by the deflecting elements, while the second sub-beam is split into at least a fourth and a fifth sub-beam by the second splitting element, the first and fourth sub-beams propagating toward a first point of incidence as a first pair of superimposed sub-beams, and the third and fifth sub-beams propagating toward a second point of incidence on the reflection material measure as a second pair of superimposed sub-beams, and
      the first and second pairs of superimposed sub-beams, after being reflected by the reflection material measure, propagate respectively toward the first and the second detector, where the sub-beams in each pair are brought into interfering superposition, so that the detectors detect first and second displacement-dependent scanning signals from which, in turn, position information regarding a vertical and a first lateral direction of displacement of the objects is derived, the first lateral direction of displacement extending in the first splitting plane or parallel thereto, wherein the incident beam is additionally split by the first splitting element in the scanning unit into further sub-beams in a second splitting plane which is oriented perpendicular to the first splitting plane, and wherein the sub-beams propagate in the second splitting plane in a manner analogous to the sub-beams in the first splitting plane, so that third and fourth displacement-dependent scanning signals are respectively detected by the third and the fourth detectors, and position information regarding the vertical direction of displacement and a second lateral direction of displacement of the objects is derived from the third and the fourth scanning signals, the second lateral direction of displacement extending in the second splitting plane or parallel thereto.

2. The optical position-measuring device as recited in claim 1, wherein the scanning unit further comprises further deflecting elements and wherein the first splitting element is configured to further split the beam into at least a sixth, a seventh, and an eighth sub-beam such that:
   the sixth and eighth sub-beams are deflected toward the reflection material measure by the further deflecting elements, while the seventh sub-beam is split into at least a ninth and a tenth sub-beam by the second splitting element, the sixth and ninth sub-beams propagating toward a third point of incidence as a third pair of superimposed sub-beams, and the eighth and tenth sub-beams propagating toward a fourth point of incidence on the reflection material measure as a fourth pair of superimposed sub-beams, and
   the third and fourth pairs of superimposed sub-beams, after being reflected by the reflection material measure, propagate toward the third and the fourth detectors, where each of the third and fourth pairs of superimposed sub-beams is brought into interfering superposition, so that the third and the fourth displacement-dependent scanning signals are detected by the third and the fourth detectors.

3. The optical position-measuring device as recited in claim 1, wherein the first splitting element and the second splitting element are each configured as a two-dimensional diffraction structure arranged in a cross-line or checkerboard pattern.

4. The optical position-measuring device as recited in claim 3, wherein the two-dimensional diffraction structure is configured as an amplitude grating or as a phase grating.

5. The optical position-measuring device as recited in claim 3, wherein the first splitting element and the second splitting element are each configured as a two-dimensional transmission-type cross grating.

6. The optical position-measuring device as recited in claim 3, wherein the first and the second splitting planes are oriented perpendicular to one another.

7. The optical position-measuring device as recited in claim 1, wherein the reflection material measure is configured as a two-dimensional diffraction structure arranged in a cross-line or checkerboard pattern.

8. The optical position-measuring device as recited in claim 7, wherein the two-dimensional diffraction structure is configured as an amplitude grating or as a phase grating.

9. The optical position-measuring device as recited in claim 7, wherein the reflection material measure is configured as a two-dimensional reflection-type cross grating.

10. The optical position-measuring device as recited in claim 1, wherein the scanning unit includes a transparent glass plate which has the first splitting element disposed on a side facing the incident light beam, and which has the second splitting element and the deflecting elements disposed on a side facing the reflection material measure.

11. The optical position-measuring device as recited in claim 10, wherein the side of the glass plate that faces the incident light beam further has disposed thereon each of the detectors, which are each configured as a structured photodetector having light-sensitive surfaces that are oriented toward an opposite side of the glass plate.

12. The optical position-measuring device as recited in claim 11, wherein the structured photodetectors each have a plurality of periodically arranged detector elements, with in-phase detector elements being electrically interconnected.

13. The optical position-measuring device as recited in claim 11, wherein the structured photodetectors are formed from a-silicon and disposed on the glass plate directly in structured form.

14. The optical position-measuring device as recited in claim 1, wherein the detectors are disposed in a same plane as the first splitting element.

15. The optical position-measuring device as recited in claim 1, wherein the deflecting elements are configured as transmission-type linear gratings.

16. A method of sensing a relative position of two objects that are movable relative to one another using an optical position-measuring device having a reflection material measure connected to a first one of the two objects and a scanning unit connected to a second one of the two objects, the method comprising:

splitting a beam incident from a light source into at least a first, a second, and a third sub beam in a first splitting plane by a first splitting element such that the first and third sub-beams are deflected toward the reflection material measure by deflecting elements;

splitting the second sub-beam into at least a fourth and a fifth sub-beam by a second splitting element such that the first and fourth sub-beams propagate toward a first point of incidence as a first pair of superimposed sub-beams, the third and fifth sub-beams propagate toward a second point of incidence on the reflection material measure as a second pair of superimposed sub-beams and the first and second pairs of superimposed sub-beams, after being reflected by the reflection material measure, propagate respectively toward a first and a second detector, where the sub-beams in each pair are brought into interfering superposition, so that the detectors detect first and second displacement-dependent scanning signals;

deriving position information regarding a vertical and a first lateral direction of displacement of the objects from the first and the second displacement-dependent scanning signals, the first lateral direction of displacement extending in the first splitting plane or parallel thereto;

splitting the incident beam by the first splitting element into further sub-beams in a second splitting plane which is oriented perpendicular to the first splitting plane such that the sub-beams propagate in the second splitting plane in a manner analogous to the sub-beams in the first splitting plane, so that third and fourth displacement-dependent scanning signals are respectively detected by third and fourth detectors; and deriving position information regarding the vertical direction of displacement and a second lateral direction of displacement of the objects from the third and the fourth scanning signals, the second lateral direction of displacement extending in the second splitting plane or parallel thereto.

* * * * *